United States Patent
Hui et al.

(10) Patent No.: US 9,444,672 B2
(45) Date of Patent: Sep. 13, 2016

(54) DATA MODULATION

(75) Inventors: Dennis Hui, Cupertino, CA (US); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 307 days.

(21) Appl. No.: 13/512,973

(22) PCT Filed: Dec. 21, 2009

(86) PCT No.: PCT/SE2009/051474
§ 371 (c)(1),
(2), (4) Date: May 31, 2012

(87) PCT Pub. No.: WO2011/078752
PCT Pub. Date: Jun. 30, 2011

(65) Prior Publication Data
US 2012/0236967 A1    Sep. 20, 2012

(51) Int. Cl.
*H04K 1/02* (2006.01)
*H04L 12/56* (2006.01)
*H04L 27/36* (2006.01)
(Continued)

(52) U.S. Cl.
CPC .............. *H04L 27/36* (2013.01); *H04L 1/0041* (2013.01); *H04L 27/3405* (2013.01)

(58) Field of Classification Search
CPC ....... H04L 27/36; H04L 27/04; H04L 27/22; H04L 2209/20; H04L 1/0057; H04L 27/38; H04L 27/2627; H04L 1/0066; H04L 5/0023; H04L 1/0618
USPC .......................................... 375/296; 370/312
See application file for complete search history.

(56) References Cited

U.S. PATENT DOCUMENTS

| | | | |
|---|---|---|---|
| 5,185,763 A | | 2/1993 | Krishnan |
| 5,559,835 A | * | 9/1996 | Betts ................. H04L 25/03343 375/265 |
| 5,802,107 A | * | 9/1998 | Willming ........... H04N 21/4382 375/265 |

(Continued)

FOREIGN PATENT DOCUMENTS

| WO | WO 2006/122142 A1 | 11/2006 |
|---|---|---|
| WO | WO 2008/150148 A2 | 12/2008 |
| WO | WO 2009/113008 A1 | 9/2009 |

OTHER PUBLICATIONS

International Search Report, PCT/SE2009/051474, Mailed Sep. 29, 2010.

(Continued)

*Primary Examiner* — Daniel Washburn
*Assistant Examiner* — Sarah Hassan
(74) *Attorney, Agent, or Firm* — Myers Bigel & Sibley, P.A.

(57) ABSTRACT

A modulator includes a symbol mapper that is configured to map respective bits sets of a bit sequence corresponding to a burst and including data, training, tail, and guard bits into respective symbols to form a symbol sequence of data, training, tail, and guard symbols. A vector precoder is configured to apply a vector precoding transformation to the data and training symbols to form precoded symbols. These precoded symbols are combined with the tail and guard symbols in a symbol processor to form a sequence of transmit symbols. The record precoding conducted by the modulator of a transmitter enables improved link performance without the cost of increased processing complexity of the receiver algorithm.

22 Claims, 6 Drawing Sheets

(51) Int. Cl.
*H04L 1/00* (2006.01)
*H04L 27/34* (2006.01)

(56) References Cited

U.S. PATENT DOCUMENTS

| | | | |
|---|---|---|---|
| 6,130,894 A * | 10/2000 | Ojard | H04L 1/0054 370/421 |
| 6,246,716 B1 * | 6/2001 | Schneider | H04B 3/21 375/220 |
| 2004/0028148 A1 * | 2/2004 | Dowling | H04L 25/03343 375/296 |
| 2005/0058217 A1 * | 3/2005 | Sandhu | H04L 1/0606 375/267 |
| 2007/0041463 A1 | 2/2007 | Wang et al. | |
| 2008/0049859 A1 * | 2/2008 | Choi | H04L 1/0041 375/261 |
| 2008/0225985 A1 * | 9/2008 | Wu et al. | 375/308 |
| 2010/0091904 A1 * | 4/2010 | Wang et al. | 375/296 |
| 2010/0309834 A1 * | 12/2010 | Fischer | H04B 7/0452 370/312 |
| 2011/0135023 A1 * | 6/2011 | Kwon | H04L 25/0204 375/260 |
| 2012/0127940 A1 * | 5/2012 | Lee | H04L 5/0023 370/329 |

OTHER PUBLICATIONS

International Preliminary Report on Patentability, PCT/SE2009/051474, Completed Oct. 26, 2011.

Chinese Office Action Corresponding to Chinese Patent Application No. 200980163093.7; Date Mailed: Jun. 16, 2014; English Translation Thereof, 2 Pages.

* cited by examiner

DATA MODULATION

CROSS-REFERENCE TO RELATED APPLICATION

This application is a 35 U.S.C. §371 national stage application of PCT International Application No. PCT/SE2009/051474, filed on 21 Dec. 2009, the disclosure and content of which is incorporated herein by reference in its entirety.

FIELD

The present invention generally relates to data processing, and in particular to modulation of data to be transmitted in a radio-based communication network.

BACKGROUND

The Global System for Mobile communication (GSM) is currently the most popular standard for mobile telephones in the world and has been commercially deployed since the early 1990s. Although more recent standards for mobile communication in radio-based communication networks have been proposed, there is still an interest on the continued improvement of the GSM technology and its improvements, such as Enhanced Data rates for GSM Evolution (EDGE) also denoted Enhanced General Packet Radio Service (EG-PRS) in the art. This means that improvements to the hardware and spectral efficiencies are still actively being sought.

With the advent of EGPRS phase 2 (EGPRS2) the GSM technology is reaching some of its limits in terms of complexity and performance. Firstly, the GSM physical layer uses single carrier modulation and highly time dispersive narrowband channels. Secondly, the need to increase the data rates and spectral efficiency has resulted in the introduction of higher order modulations. However, equalization of digitally modulated signals using these higher order modulations is a very demanding task for the receiver. The reason is that the computational complexity of the demodulator increases exponentially with the size of the symbol constellation of the modulation.

Given the time dispersion present in all GSM radio channels, the use of suboptimal receiver algorithms is unavoidable. Despite many simplifications these algorithms are still highly complex.

U.S. Patent Application No. 2008/0225985 discloses a technique for enhancing the capacity of a wireless communication channel by modulating data with a modulation scheme and transforming the modulated data from the frequency domain to the time domain. Bits are then encoded in a timeslot independence upon the time domain version of the modulated data. The document proposes using 40 pre-specified time domain values out of the 156 available in a burst, which requires 40 of the frequency domain symbols to be left as variables and cannot therefore carry any data. This process is, however, complicated and has high computational complexity.

SUMMARY

There is therefore a need for a solution that allows further improvements of the GSM technology but does not introduce high complexity in the receiver or transmitter of the communication devices.

It is an objective to provide an improved modulation in connection with a transmission chain.

It is a particular objective to provide multi-channel modulation to GSM-based communication networks.

These and other objectives are met by embodiments as disclosed herein.

Briefly, a modulator comprises a symbol mapper, to which a bit sequence corresponding to a radio burst and comprising data, training, tail and guard bits is input. The symbol mapper maps respective sets of at least one bit of the bit sequence into respective symbols to form a symbol sequence of data, training, tail and guard symbols. A vector precoder of the modulator processes the data and training symbols by applying a vector precoding transformation to these symbols to form corresponding precoded symbols. The precoded symbols are combined with the tail and guard symbols from the symbol mapper in a symbol processor to form a sequence or burst of transmit symbols, which can then be upsampled, filtered, upmixed and amplified and transmitted into the air as a radio signal during a time slot.

The vector precoding of the data and training symbols enables usage of higher order modulations as compared to the traditional modulation of GSM-compatible devices but without the associated drawbacks of increased receiver algorithm complexity as in the prior art.

An aspect of the embodiments also relates to a data modulation method involving mapping respective sets of at least one bit of an input bit sequence corresponding to a radio burst and comprising the data, training, tail and guard bits. The result of the mapping is a sequence of data, training, tail and guard symbols. A vector precoding transformation is applied to the data and training symbols to form corresponding precoded symbols that are combined with the tail and guard symbols to form a sequence of transmit symbols.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments relate to data processing in connection with a transmitter useful in a wireless, radio-based communication network. In particular, embodiments as disclosed herein relate to modulation of data in the transmitter.

The embodiments introduce a new data modulation that is particularly applicable to radio-based communication networks employing the GSM technology and its developments, i.e. EDGE/EGPRS including the recently proposed EGPRS2 technology. As is well known, GSM is a time division multiple access (TDMA)/frequency division multiple access (FDMA) system, where the allotted frequency band is divided into 200 kHz wide channels and time is split into time slots having a length of 15/26 ms, i.e. about 576.9 μs.

Figure 1:
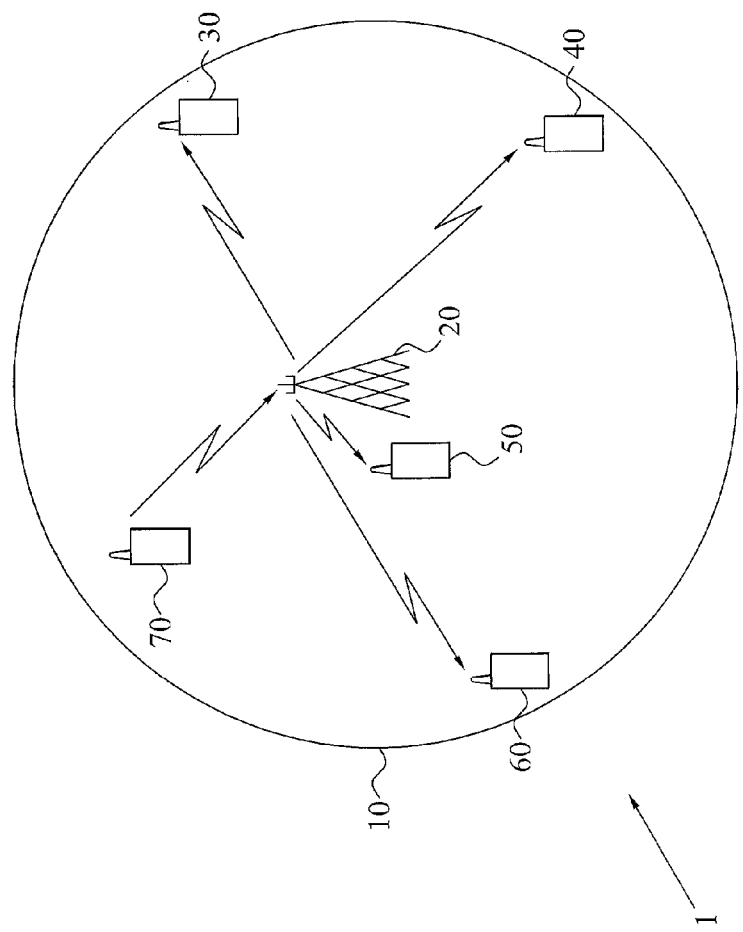
FIG. 1 is a schematic overview of a radio-based communication network in which embodiments can be implemented.

FIG. 1 is a schematic overview of a radio-based communication network 1 comprising a base transceiver station or base station 20 serving a certain geographical area, typically denoted cell 10 in the art. Mobile telephones or devices 30-70 and other communication devices present within the cell 10 can be involved in communication services using the base station 20 and the communication resources, i.e. time slots of defined frequencies, offered at the cell 10.

Embodiments introduce an extension to the basic TDMA/FDMA multiplexing of the GSM technology that achieves improved radio link performance but does not require the complex receiver algorithms of the proposed EGPRS2 technology. Thus, increased system throughput and improved spectral efficiency can be obtained through the introduction of higher order symbol constellations but without the need for equalizers and the demanding signal processing that follows from the introduction of such higher order symbol constellations according to the prior art.

The TDMA/FDMA multiplexing is extended by the introduction of discrete time channel partitioning (DTCP). DTCP is a type of multi-channel modulation, which is well suited for digital implementation. DTCP refers to a choice of transmit basis vectors and defines the relation between a discrete set of input samples and a discrete set of output samples by means of a linear transformation.

A preferred implementation of DTCP is vector precoding. Vector precoding creates a set of independent channels by a judicious choice of the transmit basis vectors. Vector precoding is further employed herein in such a way that the time and frequency divisions used in GSM are preserved. Additionally, frequency hopping which is commonly used in GSM to alleviate multipath fading can still be performed exactly as before by the introduction of vector precoding.

Figure 2:
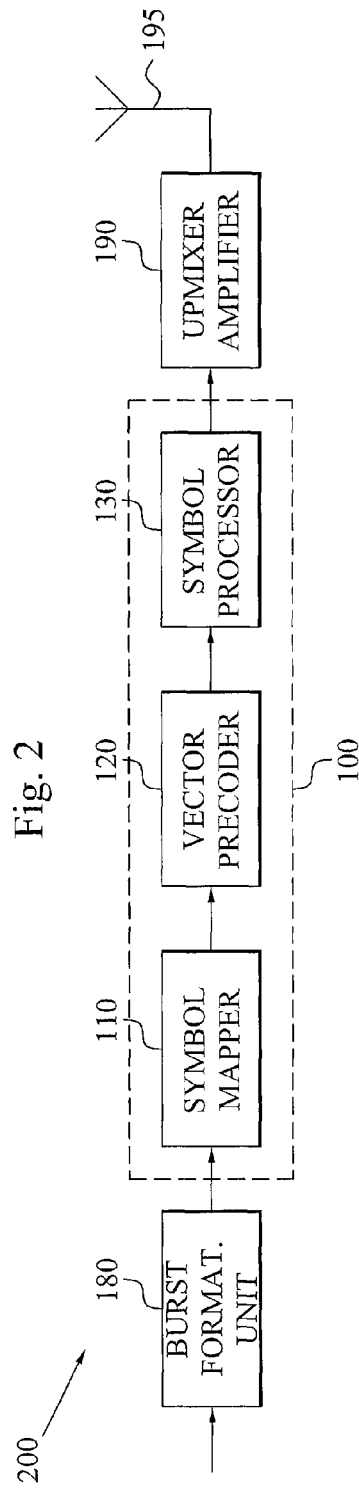
FIG. 2 schematically illustrates a transmitting chain according to an embodiment.

FIG. 2 is an illustration of a transmit chain according to an embodiment implemented as a transmitter 200 or the transmit chain of a transceiver in a communication device. The transmitter 200 comprises four main units: a burst formatting unit 180, a modulator 100 according to the embodiments, an upmixer and amplifier 190 and a connected transmit antenna 195 or transmit antenna system. The modulator 100 is exemplified as a linear modulator 100 complemented with a vector precoder 120 and additionally comprises a symbol mapper 110 and a symbol processor 130.

The symbol mapper 110 of the modulator 100 is configured to receive a bit sequence corresponding to a radio burst, preferably from the burst formatting unit 180 as illustrated in FIG. 2. The bit sequence comprises data bits and training bits. The data bits represent the user code bits carrying the payload or control data or information that is to be transmitted in the form a radio burst. Training bits are well known in the art and are used for synchronization and channel estimation. The bit sequence preferably also comprises tail bits and guard bits. Tail bits are traditionally employed for resetting the equalizer state in the receiver and the guard bits allow power ramp up and down and for some propagation time delay in the arrival of the radio bursts to ensure that the time slots do not collide with each other. Though, embodiments can use a bit sequence without these tail and guard bits they are preferably included in the bit sequence to ensure that the power versus time profile complies with the GSM specification to ensure that the signal level is known at some particular time for measurement purposes in the transmitter.

The bit sequence enters the symbol mapper 110, which processes the bit sequence by mapping respective sets of at least one bit of the bit sequence into respective symbols to form a symbol sequence. Thus, the symbol mapper 110 receives a bit sequence comprising data bits, training bits and preferably tail bits and guard bits and output a symbol sequence comprising data or payload symbols, training symbols and preferably tail symbols and guard symbols.

In an alternative embodiment, the symbol mapping operation of the symbol mapper 110 is conducted before formatting the symbol sequence into a burst. In this case the data bits, training bits and preferably the tail bits and guard bits are first mapped to respective data symbols, training symbols and tail symbols and guard symbols as described above. The resulting symbols are then formatted into a sequence corresponding to a radio burst, such as flank the data and training symbols with tail symbols and guard symbols as described herein.

The data symbols and the training symbols from the symbol mapper 110 are input to the vector precoder 120. The vector precoder 120 processes these symbols by applying a vector precoding transformation to the data symbols and the training symbols to form corresponding precoded symbols or transmit versions of the data symbols and the training symbols.

The vector precoder 120 thereby performs a coordinate transformation that induces channel partitioning.

The output from the vector precoder 120, i.e. the precoded symbols, is combined with the tail and guard symbols from the symbol mapper 110 in the symbol processor 130 to from a sequence or burst of transmit symbols.

Embodiments of the present invention will now be described in more detail in connection with implementation examples.

The burst formatting unit 180 receives the data bits and combines these with the training bits, tail bits and guard bits to form the bit sequence corresponding to a radio burst. This bit sequence has the following structure after burst formatting:

$$\Big( \underbrace{b_1, \ldots, b_\alpha}_{guard}, \underbrace{b_{\alpha+1}, \ldots, b_\beta}_{tail}, \underbrace{b_{\beta+1}, \ldots, b_\chi}_{data},$$

$$\underbrace{b_{\chi+1}, \ldots, b_\delta}_{training}, \underbrace{b_{\delta+1}, \ldots, b_\varepsilon}_{data}, \underbrace{b_{\varepsilon+1}, \ldots, b_\phi}_{tail}, \underbrace{b_{\phi+1}, \ldots, b_\phi}_{guard} \Big)$$

Alternatively, all guard bits can be provided at the end or at the beginning of the bit sequence. This is the traditional organization of bits in the normal burst of GSM. In the prior art, 26 training bits, 2×3 tail bits and 8.25 guard bits are used to complement the 2×58 data bits. If the symbol mapper 110 employs a lower order of modulation, such as binary phase-shift keying (BPSK), for respective sets of one bit, the above mentioned bit lengths of respective portions of the bit sequence can advantageously be used. However, embodiments as disclosed herein can advantageously be used in connection with higher order modulations, in which sets of multiple, i.e. at least two, bits are mapped into respective symbols, such as by means of quadrature PSK (QPSK), 8-PSK, 4/16/32/64 or even 128 quadrature amplitude modulation (QAM) that map sets of two (QPSK, 4 QAM), three (8-PSK), four (16 QAM), five (32 QAM), six bits (64 QAM) or seven bits (128 QAM) into a symbol.

The bit sequence is input to the symbol mapper 110 to map sets of one or more bits into respective symbols drawn from a symbol constellation, such as one of the above-mentioned PSK and QAM symbol constellations. The symbol mapping, thus, results in the symbol sequence:

$(b_1, \ldots, b_\alpha, b_{\phi+1}, \ldots, b_\phi) \to g = (g_1, \ldots, g_\eta)$ guard $(b_{\alpha+1}, \ldots, b_\beta, b_{\epsilon+1}, \ldots, b_\phi) \to t = (t_1, \ldots, t_\nu)$ tail $(b_{\beta+1}, \ldots, b_\chi, b_{\delta+1}, \ldots, b_\epsilon) \to x = (x_1, \ldots, x_D)$ data $(b_{\chi+1}, \ldots, b_\delta) \to s = (s_1, \ldots, s_{N_{tr}})$ training where g, t, x, s denote the (PSK/QAM) symbols that carry the guard, tail, data and training bits, respectively. The symbol sequence comprises D data symbols and $N_{tr}$ training symbols, with a total of data symbols and training symbols of $N=D+N_{tr}$. The total number of symbols in the symbol sequence corresponding to a radio burst is $K=N+\eta+\nu$. For a GSM/EDGE implementation, typical values of these parameters are N=142, $\eta$=8 and $\nu$=6.

The output of the symbol mapper 110 is, thus, the symbol sequence:

$[c_1, \ldots, c_K] = [g, t, x, s]$

Figure 3:
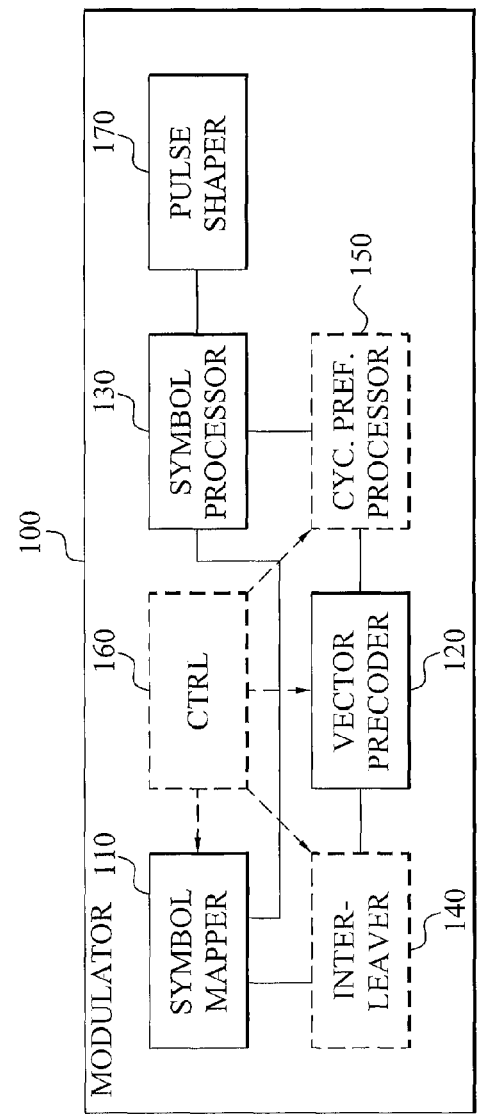
FIG. 3 schematically illustrates a modulator according to an embodiment.

With reference to the modulator embodiment illustrated in FIG. 3, the modulator 100 advantageously comprises a symbol interleaver 140 implemented to intercalate the training symbols and the data symbols for synchronization and channel estimation purposes. In the prior art, such interleaving is conducted by placing all the training symbols in the middle of the data symbols to thereby form a first set of 58 data symbols followed by 26 training symbols and then the remaining 58 data symbols.

In a preferred implementation, the symbol interleaver 140 is configured to interleave the training symbols among the data symbols to form at least Q≥3 sets of data symbols separated by respective sets of at least one training symbol. This means that the training symbols are preferably distributed or spread out among the data symbols and not all concentrated in the middle of the symbol sequence and thereby in the middle of the radio burst. The particular location of the training symbols has an impact on the receiver performance and thereby it is generally advantageous to distribute the training symbols and not concentrate all these symbols in a single set. The particular interleaving scheme employed by the symbol interleaver 140 can depend on various parameters, such as the code rate or presence of in-band signaling. This means that the employed interleaving scheme can, for instance, be selected to reduce the overall channel estimation error. It can also be advantageous to interleave the training symbols within the data symbols at positions that are expected to have higher signal-to-noise ratios (SNRs) as compared to other symbol positions within the sequence and the radio burst. An example implementation is to uniformly distribute the training symbols among the data symbols.

The symbol interleaver 140 thereby outputs a vector z of length N symbols that is constructed from the data symbols x and the training symbols s:

$$z = [z_1, \ldots, z_N]^T = [x_1, \ldots, s_1, \ldots, x_p, s_m, \ldots, x_{N_{tr}}, \ldots, x_D]^T$$
$$\updownarrow \quad \updownarrow \quad \updownarrow \updownarrow \quad \updownarrow \quad \updownarrow$$
$$k(1) \ldots n(1) \ldots k(p)n(m) \ldots n(N_{tr}) \ldots k(D)$$

The location of the training symbols is given by the indices $(n(m))_{m=1}^{N_{tr}}$ and the location of the data symbols is likewise given by $(k(p))_{p=1}^{D}$. In other words $z_{n(m)} = s_m$ and $z_{k(p)} = x_p$.

The output vector from the optional but preferred symbol interleaver 140 is forwarded to the vector precoder 120, where vector precoding is applied to the vector z to form a new sequence of complex numbers Z representing the precoded symbols.

In a preferred implementation, the vector precoding transformation employed by the vector precoder 120 is a discrete transformation and more preferably selected from the group consisting of discrete Fourier transform (DFT), inverse DFT (IDFT), discrete cosine transform (DCT), inverse DCT (IDCT), discrete wavelet transform (DWT) and inverse DWT (IDWT).

The vector precoder 120 then applies a precoding matrix W to the vector with the interleaved training and data symbols to perform a coordinate transformation that induces channel partitioning.

For example, in the case of IDFT precoding, W is the Fourier transform matrix of size N×N. The entries in the matrix can be defined as or at least be derivable from $$W_{m,i} = \frac{1}{\sqrt{N}} e^{-j2\pi \frac{(m-1)(i-1)}{N}},$$

m=1, ..., N, i=1, ..., N, where m is a row counter and i is a column counter of the matrix. By employing IDFT precoding, the vector precoder 120 performs a coordinate transformation that yields as transmit basis vectors the eigenvectors of the radio channel matrix. These eigenvectors are nearly independent of the propagation environment.

The vector precoding operation conducted by the vector precoder 120 is therefore:

$Z = W^H z$

Multiplication by the matrix $W^H$ can be implemented efficiently using the fast forward transform (FFT). $W^H$ is an Hermitian matrix, i.e. a square matrix with complex entries which is equal to its own conjugate transpose. In other words the matrix element in the m-th row and i-th column is equal to the complex conjugate of the element in the i-th row and the m-th column. If the vector precoder 120 performs a coordinate transformation using IDFT, the eigenvectors of the radio channel matrix will be the transmit basis vectors. These eigenvectors are nearly independent of the propagation environment.

As another example, the vector precoder 120 could instead apply a vector precoding transformation that is based on DCT. In such a case, the precoding matrix w is given by:

$$W_{m,i} = \sqrt{\frac{2}{N}} \cos\left(\frac{\pi}{2N}(i-1)(2m-1)\right),$$

$$m = 1, \ldots, N, i = 1, \ldots, N$$

and the IDCT matrix is given by:

$$W_{m,i} = \sqrt{\frac{2}{N}} a(i-1)\cos\left(\frac{\pi}{2N}(i-1)(2m-1)\right), m = 1, \ldots, N,$$

$$i = 1, \ldots, N$$

where $$a(k) = \begin{cases} \frac{1}{2} & k = 0 \\ 1 & 1 \leq k \leq N-1 \end{cases}$$

In an optional but preferred embodiment, the modulator 100 comprises a cyclic prefix processor 150 that operates on and processes the output from the vector precoder 120. The cyclic prefix processor 150 adds a cyclic prefix to the precoded symbols. The purpose of such cyclic prefix is to allow multipath to settle before the main data arrives at the receiver.

A cyclic prefix processor 150 can be used in order to mitigate time dispersion and make the signaling less sensitive to time dispersion on the radio channel. The cyclic prefix processor 150 is configured to add a cyclic prefix of length $L \geq 0$ symbols to the precoded symbols from the vector precoder 120. If $L=0$ no cyclic prefix is employed whereas a non-zero integer value of the parameter L indicates that the cyclic prefix processor 150 has a cyclic prefix to the precoded symbols. In a preferred implementation the cyclic prefix processor 150 is configured to append the last L precoded symbols in the vector Z from the vector precoder 120 at the beginning of the vector to form a new vector $Z^P$:

$$Z^P = [Z_1^P, \ldots, Z_{N+L}^P] = [Z_{N-L}, Z_{N-L+1}, \ldots, Z_N, Z_1, Z_2, \ldots, Z_N]$$

The output from the cyclic prefix processor 150 is forwarded to the symbol processor 130, which also receives the tail symbols and the guard symbols from the symbol mapper 110.

In an alternative embodiment, the cyclic prefix processor 150 operates as a cyclic postfix processor to instead add a cyclic postfix to the precoded symbols. In a preferred implementation, the processor is then configured to append the first L precoded symbols in the vector Z from the vector precoder 120 at the end of the vector to form a new vector.

In yet another approach that is in particular suitable with DCT as vector precoding transformation but can also be employed in connection with other vector precoding embodiments is to have a processor 150 that adds both a cyclic prefix and a cyclic postfix to the precoded symbols. The prefix and the postfix can then be of the same length in terms of the number of symbols but can also be of different lengths.

It is anticipated by the embodiments that the processor 150 does not necessarily have to add a cyclic prefix and/or postfix but can be configured to add a prefix and/or postfix, which may be but does not have to be cyclic.

The symbol processor 130 forms a sequence of transmit symbols based on the input data, where this sequence of transmit symbol is a sequence of complex numbers:

$$d = [d_1, d_2, \ldots, d_{K+}] = [g_1, \ldots, t_1, \ldots, Z_1^P, Z_2^P, \ldots, Z_{N+L}^P, \ldots, t_{84}, \ldots, g_n]$$

Thus, the transmit symbols comprises the precoded symbols preceded with the optional cyclic prefix flanked by tail symbols, which in turn may be flanked guard symbols. In an embodiment, v is an even number and half the tail symbols precede the precoded symbols and the cyclic prefix and the remaining half follow after the precoded symbols. In the case of an odd number, the odd tail symbol can either precede or follow the precoded symbols. The guard symbols can also be distributed in this manner with half of them before the first set of tail symbols and the remaining half following the second set of tail symbols. Any odd guard symbol can then be placed in the first or second set of guard symbols. In an alternative embodiment, the guard symbols are not distributed into two sets. Instead all guard symbols are provided in the beginning of the sequence or at the end of the sequence.

The output from the symbol processor 130 is preferably input to an optional pulse shaper 170 that modulate the sequence of transmit symbols onto a carrier signal followed by upsampling, filtering, upmixing and amplification in an upmixer and amplifier 190 before transmission by the antenna 195 to the air using a linear modulator.

The modulator embodiments as disclosed herein are suitable for implementation in a transmitter or in the transmitting chain of a communication device to enable wireless transmission of data in a radio-based communication network. Through the operation of the vector precoder 120 of the modulator 100, a simplified receiver algorithm can be utilized that does not have to be based on computationally complex Trellis-based equalizers. In clear contrast and due to the vector precoding conducted in the transmitter, inter symbol interference can be eliminated at the receiver. As a consequence, a simple signal model is obtained that can used to determine the log-likelihood ratios for the coded user bits, i.e. the so-called soft values.

The embodiments can achieve radio link performances that are at least at the levels obtainable by the EGPRS2 technology, though at substantially less complex receiver algorithms. This therefore results in increased throughput and improved spectral efficiency without any increased complexity and cost of the receiver algorithm. As a side effect, lower power consumption per bit is expected both at the transmitter and at the receiver. In particular, the lower complexity at the receiver reduces the power consumption needs, which is highly advantageous for battery-powered communication devices such as mobile devices.

The embodiments further provide a more robust physical layer as compared to the proposed EGPRS2 technology by making the receiver performance less sensitive to imperfections in both the transmitter and receiver chains, which is today a significant problem for the receivers. In particular for the higher order modulations introduced with EGPRS2, the sensitivity to any imperfections, distortions or noise introduced in the processing at the transmitter and/or receiver increases significantly. These problems are solved or at least mitigated by the embodiments.

The modulator 100 of the embodiments is advantageously implemented in base stations of the communication network, such as the base station 20 illustrated in FIG. 1. The modulator 100 can be implemented in legacy GSM/EDGE base stations since the solutions presented by the invention are fully backward compatible with GSM/EDGE. As has been mentioned in the foregoing, the TDMA/FDMA structure can be preserved, frequency hopping can be performed as in the current GSM/EDGE-based communication networks and the basic 13 MHz clock used as time base counter in both base transceiver stations and mobile devices still provides the time base. Additionally, even already defined EGPRS/EGPRS2 logical channels may be re-used and modified by adding DTCP and vector precoding in the modulator, resulting in improved link performance, while re-using existing digital signal processing circuitry, algorithms and implementations. Also specific radio frequency (RF) requirements such as out of band emissions and spectrum masks may be preserved.

The modulators employed in the user devices communicating with the base station, i.e. the mobile devices, can also be designed according to the embodiments. Alternatively, vector precoding could be used only in the downlink to thereby relax the need for modifying the transmitter algorithms of all mobile devices. Thus, in such a case the downlink and uplink will be different with vector precoding employed by the base stations in the downlink transmissions but not necessarily by the mobile devices for uplink transmissions. An asymmetric TDMA/FDMA/DTCP system is thus achieved.

Vector precoding is suitable for implementation in connection with higher order modulation. In such a case, the symbol mapper 110 is configured to map sets of multiple bits into respective symbols. This means that the throughput will increase since the amount of data in terms of data or payload bits that can be transmitted during a radio burst is significantly increased as compared to using the traditional non-linear Gaussian minimum shift keying (GMSK) modulator used for voice services and some packet data services in existing GSM/EDGE communication networks.

The vector precoding is therefore suitable for usage in connection with communication services requiring high data rate transmissions, such as some data packet services. In such a case, the base station and the transmitter can select whether to apply to the modulation of the embodiments or traditional modulation based on the particular communication service employed. Thus, for voice services and other delay sensitive communication services, the transmitter can perform traditional modulation using non-linear GSMK. In clear contrast, communication services having demands for higher data rates and generally using higher order modulation, such as QPSK, 8-PSK, 16 QAM, 32 QAM, 64 QAM or 128 QAM, could use the vector precoding in connection with the linear modulator. Therefore selection of modulation algorithm, i.e. vector precoding or not and usage of low or higher order modulation, can be made at the transmitter based on the current communication services.

The modulator 100 may therefore be equipped with a controller 160 that controls the operation of the symbol mapper 110 and the vector precoder 120. The controller 160 then determines the communication service for the current data to be transmitted and then selects between employing non-linear GMSK modulation or higher order modulation with or without vector precoding based on the determined communication service.

The selection whether or not to apply vector precoding as determined by the controller 160 can also be based on the capabilities of the mobile devices. The register over the mobile devices present in the communication network can then list whether the mobile devices support linear transformation modulation or not. In such a case, the base station requests such information from the register or automatically receives the information once it becomes the serving base station for the mobile device. The controller 160 uses the information to determine how modulation of the user code data should be conducted, such as whether vector precoding should be employed or not based on the capability information.

A further decision basis to employ by the controller 160 could be the signal or link quality of the communication link between the base station and a mobile device. Any of the known quality measures, such as SNR, determined by the base station or the mobile device and reported to the base station can be used by the controller 160. For instance, if the current signal quality is low as determined based on the quality measure, i.e. below a predefined minimum quality threshold, the controller 160 could be configured to control the modulator 100 to perform modulation of user code data according to the traditional GSMK modulation approach. However, if the current signal quality is acceptable, i.e. above the quality threshold, the controller 160 activates the vector precoder 120 to thereby perform vector precoding on data and training symbols from the symbol mapper 110 or the preferred symbol interleaver 140.

The controller 160 can also be used in order to control the operation of the symbol mapper 110, the symbol interleaver 140, the vector precoder 120 and the cyclic prefix processor 150. For instance, the controller 160 can control the cyclic prefix processor 150 to use a selected parameter L, i.e. the length of the (cyclic) prefix and/or postfix, based on control signaling from the controller 160. The parameter L could then be determined by the controller 160 based on the current propagation environment as determined from signal quality measurements. For instance, different cyclic prefix lengths are preferably employed depending on whether the communication takes place indoors or outside in relative free and unblocked terrain. A non-limiting example of L=5 can be used to correspond to the typical GSM channel length.

The interleaving of the training symbols among the data symbols can be selected by the controller 160 based on different criteria as has previously been mentioned, e.g. code rate and presence of in-band signaling. This means that the controller 160 thereby may control the symbol interleaver 140 to position the training symbols at positions that are most suited for the current signaling conditions.

Additionally, the parameters N, $N_{tr}$ and v, i.e. total number of data and training symbols, number of training symbols and number of tail symbols, could either be fixed or adjusted by the controller 160. For instance, the choice of the parameters N and $N_{tr}$ depend on whether backward compatibility with EGPRS/EGPRS2 codes is required since they affect the total number of user coded bits that are accommodated in a radio burst. The parameter v can similarly be chosen by the controller 160 depending on the difficulty for the transmitter 200 to satisfy time mask requirements.

Depending on the particular choice of the parameters L, N, $N_{tr}$ and v each radio burst can accommodate a different number of user coded bits than that currently offered by the existing EGPRS/EGPRS2 coding schemes. In such a case, the burst formatting unit 180 or preferably a rate matching unit of the transmitter 200 can be used. The rate matching unit is not illustrated in FIG. 2 but is preferably implemented prior the burst formatting unit 180 to conduct the rate matching before burst formatting. The rate matching unit is then configured to conduct rate matching through additional puncturing, imputation of punctured coded bits or repetition of coded bits generated by the existing EGPR/EGPRS2 codec.

As has been previously discussed, the embodiments are preferably used in connection with higher order modulations. In such a case, one and the same symbol constellation may be used for all bits that are mapped by the symbol mapper 110 into respective symbols. However, it is also possible to control the symbol mapper 110 by the controller 110 to tune the symbol mapping to increase the channel capacity. In such a case, the symbol mapper 110 can be controlled to choose symbols from different symbol constellations during a single radio burst, for instance one symbol may be QPSK whereas another symbol is 32 QAM. The symbol mapper 110 consequently is configured and controlled to select, for each respective set of at least one bit in the bit sequence, a symbol constellation to use for that respective set. The symbol constellation is preferably selected among a QAM symbol constellation and a PSK symbol constellation. In a preferred implementation, the particular choice of symbol constellation can be based on the position of the respective set within the bit sequence and correspondingly the position of the resulting symbol within the symbol sequence. Since the radio channel has a bandpass characteristic, some symbols in any given burst will generally have a higher average signal to noise ratio than others. Therefore, in order to optimize the channel capacity, it may be advantageous to allow the simultaneous use of several symbol constellations within one burst. Generally with mixed modulation scheme the weaker symbols should belong to the lower order symbol constellation as compared to other symbols in the symbol sequence. Two or more different symbol constellation can be used in such a mixed modulation scheme.

The traditional GSM/EDGE channel has a transmit pulse bandwidth of 200 kHz. This same pulse bandwidth can be used by the embodiments. However, the data rate can be increased by a factor M by increasing the transmit pulse bandwidth by the same factor. In such a case, the pulse shaper 170 of the modulator 100 or alternatively implemented outside of the modulator 100 in the transmitter 200 is configured to modulate the sequence of transmit symbols from the symbol processor 130 onto a carrier signal having a bandwidth of M×200 kHz. M is consequently a positive integer equal to one or larger. If M>1 M 200 KHz adjacent radio channels will be used for transmitting the radio burst. Embodiments therefore opens up the possibility to use wider radio channels, thus increasing the data rates, while keeping low the requirements on the complexity of the analog and digital signal processing platforms in the receiver.

The embodiments as disclosed herein can re-use the already defined codecs of EGPRS/EGPRS2 and thus the technique proposed herein has the additional advantage of being transparent to higher layers.

The units 110 to 170 of the modulator and 110, 180, 190 of the transmitter 200 may be implemented or provided as hardware or a combination of hardware and software. In the case of a software-based implementation, a computer program product implementing the modulator 100 or the transmitter 200 or a part thereof comprises software or a computer program run on a general purpose or specially adapted computer, processor or microprocessor. The software includes computer program code elements or software code portions illustrated in FIGS. 2 and 3. The program may be stored in whole or part, on or in one or more suitable computer readable media or data storage means such as magnetic disks, CD-ROMs, DVD disks, USB memories, hard discs, magneto-optical memory, in RAM or volatile memory, in ROM or flash memory, as firmware, or on a data server.

Figure 4:
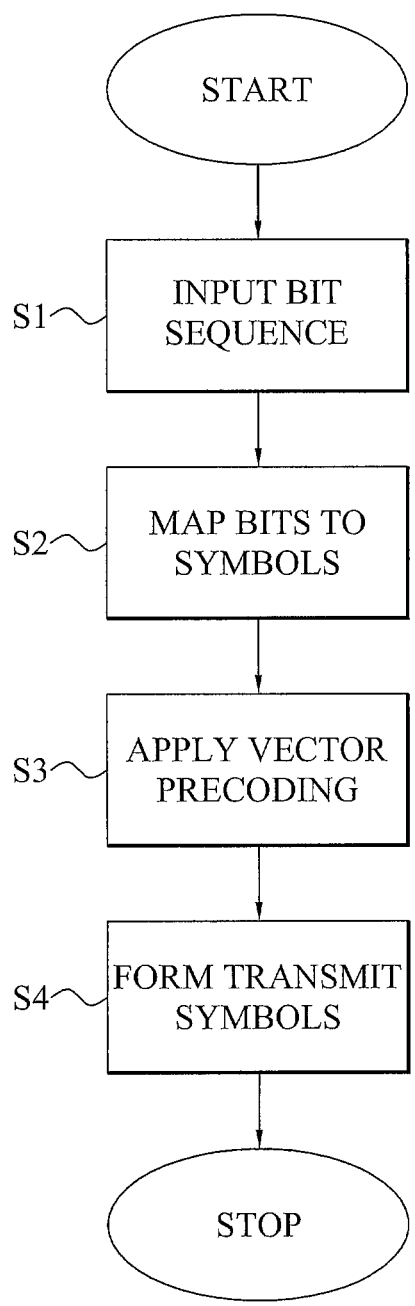
FIG. 4 is a flow diagram illustrating a modulation method according to an embodiment.

FIG. 4 is a flow diagram illustrating a data modulation method according to an embodiment. The method starts in step S1 where a bit sequence corresponding to a radio burst is input. The bit sequence comprises data bits corresponding to user code bits, also denoted payload bits. Additionally, training bits and preferably tail and guard bits are included in the bit sequence. Respective sets of at least one bit of the bit sequence is mapped into respective symbols in step S2 to form a symbol sequence of data symbols, training symbols and preferably tails and guard symbols. A vector precoding transformation is applied in step S3 to the data and training symbols to form corresponding precoded symbols thereof. A next step S4 forms a sequence of transmit symbols based on the precoded symbols and the preferred tail and guard symbols.

A preferred embodiment of step S2 involves mapping respective sets of multiple bits of the bit sequence into respective symbols to form the symbol sequence. In this embodiment there is a many-to-one relationship between bits and symbols.

In an alternative approach, the data, training, tail and guard bits are first mapped into respective symbols and are then formatted and organized into a burst before continuing further into the vector precoding step S3.

Figure 5:
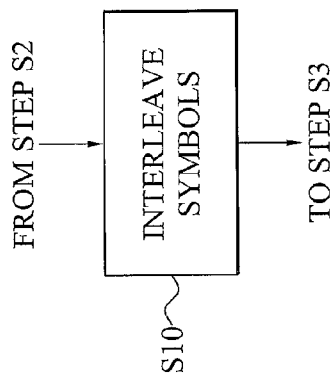
FIG. 5 is a flow diagram illustrating an additional method step of the modulation method in FIG. 4 according to an embodiment.

FIG. 5 is a flow diagram illustrating an additional preferred step of the data modulation method. The method continues from step S2 of FIG. 4 and continues to step S10. Step S10 comprises interleaving the training symbols among the data symbols to form several, i.e. at least three, sets of data symbols separated by respective sets of one or more training symbols as has previously been described. The method then continues to step S3 of FIG. 4, where vector precoding is applied to the now interleaved training and data symbols.

Figure 6:
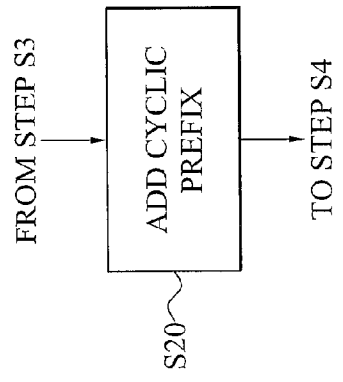
FIG. 6 is a flow diagram illustrating an additional method step of the modulation method in FIG. 4 according to another embodiment.

FIG. 6 is another flow diagram illustrating an additional preferred step of the data modulation method. The method continues from step S3 of FIG. 4 and continues to step S20. Step S20 involves adding a prefix and/or postfix, such as a cyclic prefix and/or postfix, to the precoded symbols generated in step S3. The prefix/postfix is formed by appending a set of the last/first precoded symbol(s) from the sequence of precoded symbols at the beginning/end of the sequence. Thus, the last/first precoded symbol(s) is copied and placed first/last in the sequence of precoded symbols. The method then continues to step S4 of FIG. 4.

Figure 7:
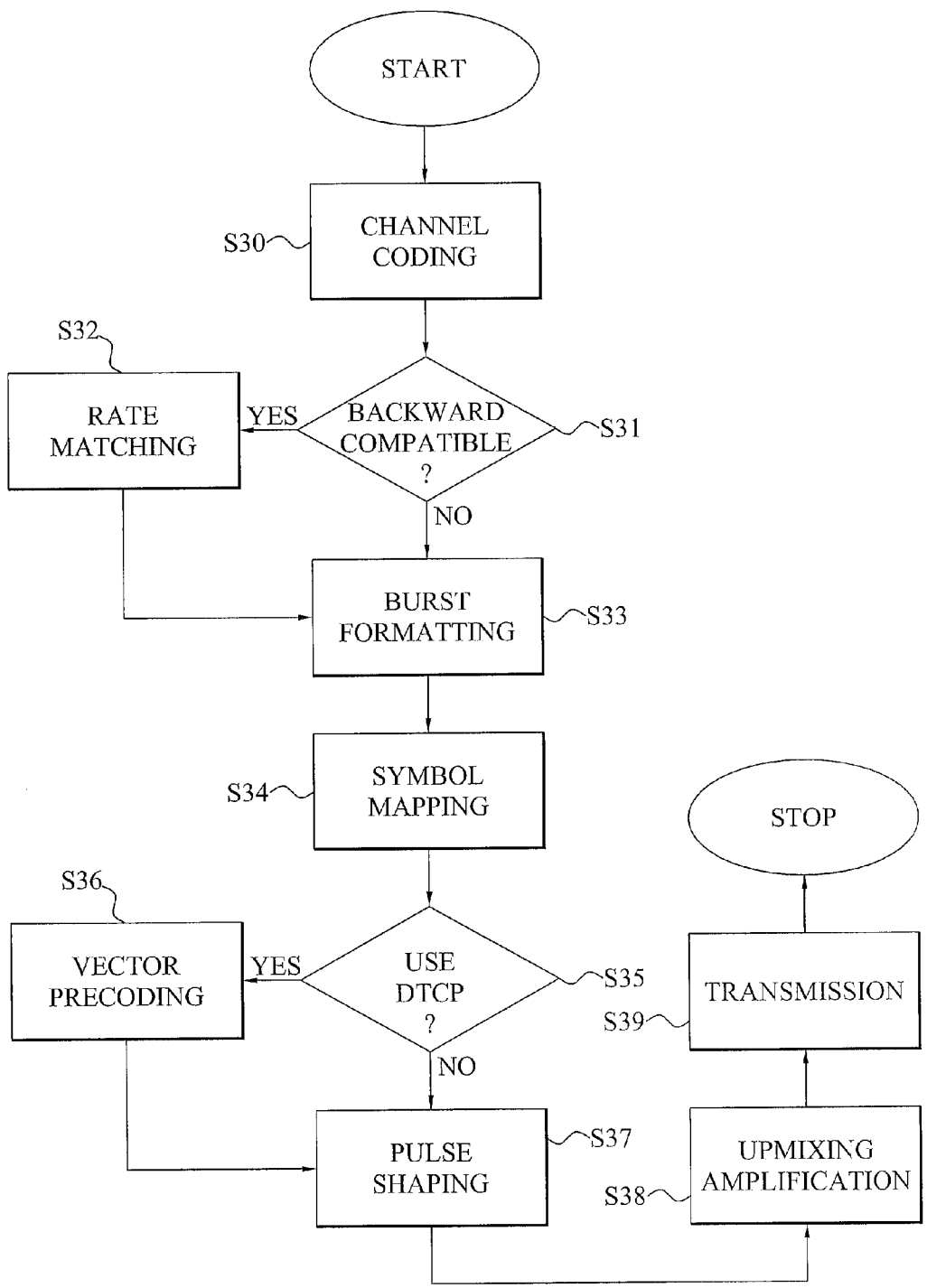
FIG. 7 is a flow diagram illustrating a transmitting method according to an embodiment.

FIG. 7 is a flow diagram illustrating a transmitting method that can be made EGPRS/EGPRS2 compatible. The method starts in step S30 where data bits enter a channel coding operation, in which training bits are included with the data bits. In a possible implementation similar to the prior art EGPRS/EGRPS2, the training bits can all be positioned together in the center of the sequence of data bits to thereby divide the data bits into to equally large sub-sequences.

In a next step S31 it is determined whether the DTCP-based processing should be backward compatible with EGPRS/EGPRS2. If backward compatibility is desired the method continues to step S32, where rate matching is performed to accommodate the same number of data bits that is defined according to the EGPRS/EGPRS2 standard. The rate matching can be performed through additional puncturing, imputation of punctured coded bits or repetition of coded bits depending on the current situation, i.e. the number of training and data bits from the channel coding step S30. If backward compatibility is not necessary, the radio burst can accommodate a different number of data bits than the EGPRS/EGPRS2 coding schemes.

The method continues to step S33, where burst formatting is performed to add tail and guard bits organize these together with the data and training bits to form a bit sequence to be transmitted during a radio burst. The bits of the bit sequence are mapped into symbols in step S34 as has previously been described, e.g. in connection with step S2 of FIG. 4. The output from the symbol mapping is the symbol sequence comprising data, training, tail and guard symbols.

The order of steps S33 and S33 can alternatively be interchanged so that symbol mapping is performed before burst formation.

A next step S35 determines whether DTCP should be applied or not. This decision can be based, as has previously been described, on the current communication service, the mobile device capability and/or the current signal quality. If DTCP is to be used the method continues to step S36 where vector precoding is applied to the data and training symbols to form precoded symbols as has been discussed in the foregoing, e.g. in connection with step S3 of FIG. 4. In a preferred implementation as illustrated in FIG. 3, symbol interleaving is, however, conducted before vector precoding. As a consequence a symbol interleaving step may be introduced between steps S35 and S36.

The method continues from step S36 or S35 to S37 where pulse shaping is performed. The pulse shaping can be conducted according to well known EGPRS/EGPRS2 techniques. Alternatively, the transmit symbols from step S36 or S35 can be modulated onto a carrier signal having a bandwidth that is a multiple of the traditional GSM channel bandwidth of 200 kHz.

The resulting analog RF signal is then upmixed and amplified in step S38 and transmitted in step S39 by an antenna system during a time slot having a length of $15/26$ ms to meet the TDMA requirements of GSM systems.

Figure 8:
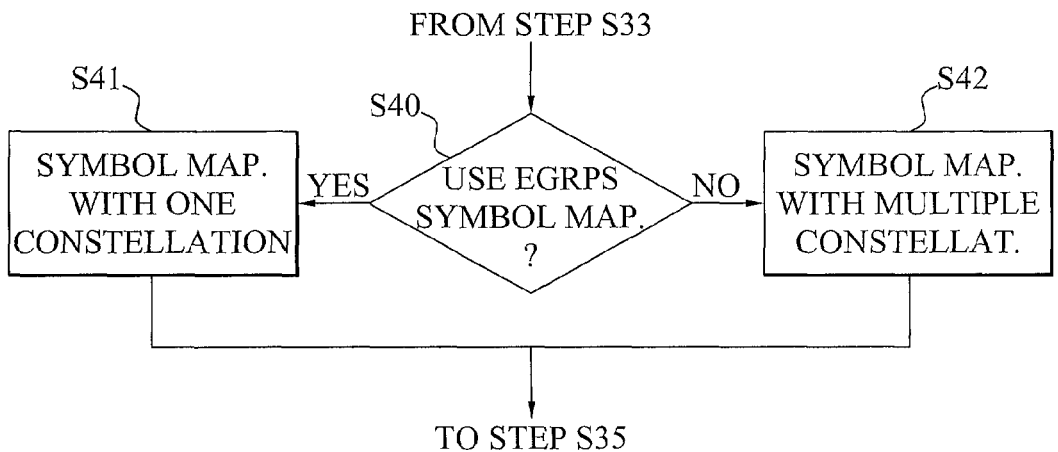
FIG. 8 is a flow diagram illustrating an embodiment of the symbol mapping step of the transmitting method in FIG. 7.

FIG. 8 is a flow diagram illustrating an embodiment of the symbol mapping step S34 of FIG. 7. The method continues from step S33 in FIG. 7 and continues to step S40. In step S40 it is determined whether the symbol mapping used in EGPRS/EGPRS2 should be employed or not. If affirmative the method continues to step S41, where symbol mapping is performed using a single symbol constellation, such as QPSK, 16 QAM, 32 QAM, 64 QAM or 128 QAM. If, however, the symbol mapping must not necessarily be according to EGPRS/EGPRS2 the method continues to step S42. In this case multiple symbol constellation can be used within the single radio burst. This means that some of the symbols can be from a first symbol constellation, whereas other bits are mapped into symbols using a second symbol constellation. In step S42 two or more different symbol constellations can be used. The method then continues from step S41 or S42 to S35 in FIG. 7.

Figure 9:
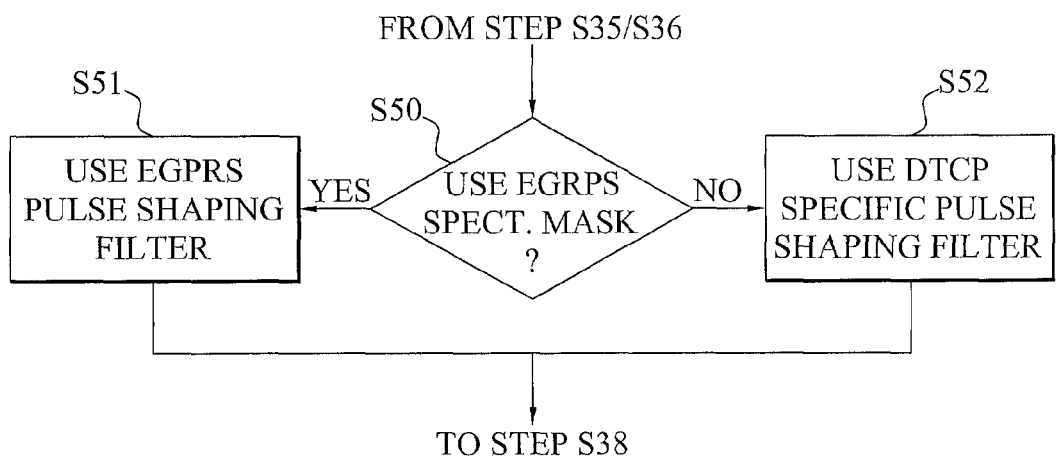
FIG. 9 is a flow diagram illustrating an embodiment of the pulse shaping step of the transmitting method in FIG. 7.

FIG. 9 is a flow diagram illustrating an embodiment of the pulse shaping step S37 of FIG. 7. The method continues from step S35 or S36 in FIG. 7 and continues to step S50. This step S50 is preferably only relevant if vector precoding has been used. Thus, if vector precoding has not been used the method continues directly to step S51. Otherwise step S50 determines whether the EGPRS/EGPRS2 spectrum mask should be preserved and used. In such a case, the method continues to step S51 where the EGPRS/EGPRS2 pulse shaping filter is employed in the pulse shaping operation. Otherwise a DTCP specific pulse shaping filter is used in step S52. This pulse shaping filer is designed to employ the bandwidth provided by multiple adjacent 200 kHz GSM carriers. The method then continues from step S51 or S52 to step S38 of FIG. 7.

Simulations have been conducted comparing the prior art EGPRS2-A technique and an embodiment with a DTCP-based EGPRS-A compatible technique. In this simulation the EGPRS2-A modulation and coding schemes DAS5-DAS12 have been used with the 8-PSK, 16QAM and 32QAM modulation constellations. The payload and channel coding from these modulation and coding schemes, together with the following simulation assumptions have been used: i) 900 MHz band, ii) no transmitter impairments, iii) legacy linearized GSMK pulse shaping filter, iv) receiver impairments: phase noise, 1.5 deg RMS, 20 kHz bandwidth, v) frequency offset: 50 Hz, vi) single branch transmitter and single branch receiver, vii) the training symbols are uniformly distributed over the burst (applicable only in connection with DTCP technique), viii) propagation mode: TU50noFH, and ix) DTCP is implemented using IDFT-based vector precoding.

Figure 10:
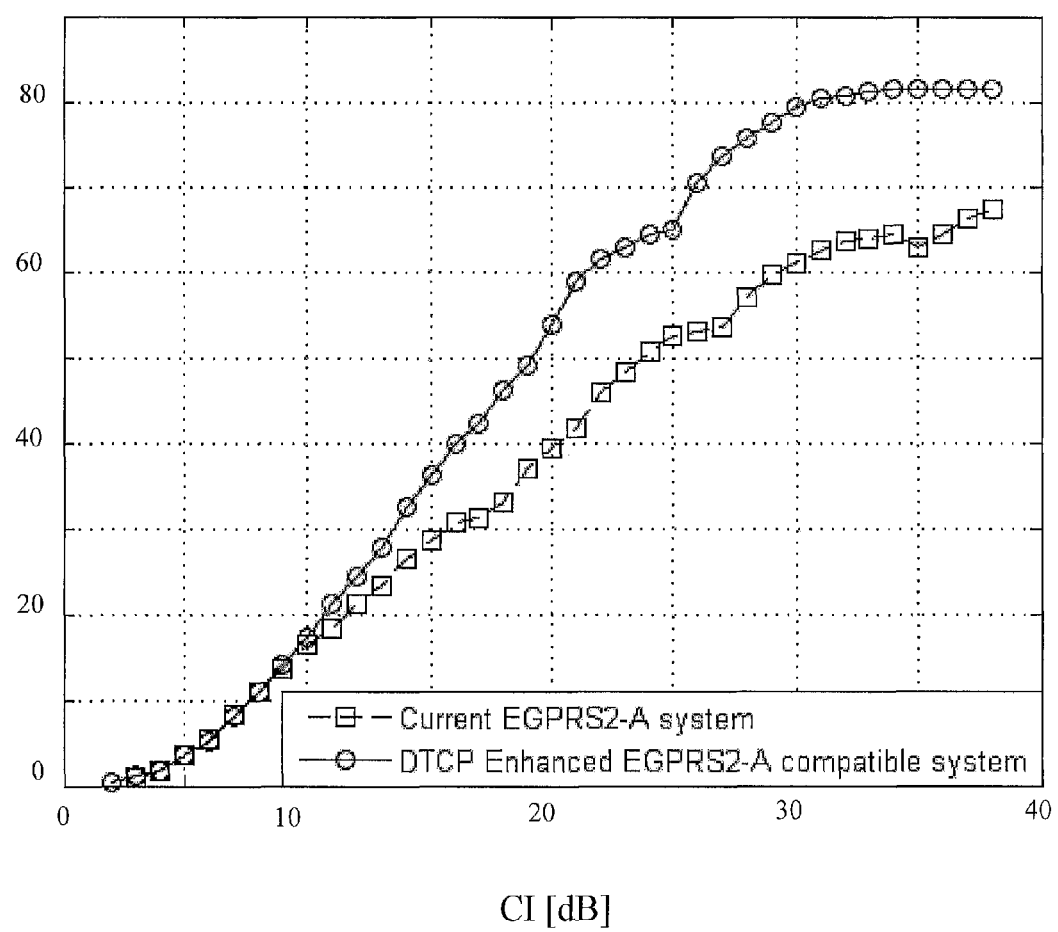
FIG. 10 is a diagram comparing downlink throughput between an EGPRS2-A system and an embodiment.

The results from the simulation are illustrated in the diagram of FIG. 10, where the throughput in kbit/s is plotted verses carrier-to-interference ratio (CI). As is seen from the figure the embodiment employing the proposed DTCP enhancement achieves substantially the same throughput as the prior art solution at low CI levels, i.e. below about 10 dB. However, over about CI 10 dB the proposed DTCP enhancement provides superior throughput as compared to the prior art techniques.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A modulator comprising:
   a symbol mapper configured to receive a bit sequence corresponding to a radio burst and comprising data bits, training bits, tail bits and guard bits and to map respective sets of at least one bit of said bit sequence into respective symbols to form a symbol sequence comprising data symbols, training symbols, tail symbols and guard symbols;
   a vector precoder configured to apply a vector precoding transformation to said data symbols and said training symbols without applying the vector precoding transformation to said tail symbols and said guard symbols to form corresponding precoded symbols of said data symbols and said training symbols;
   a processor configured to add one of a prefix and a postfix to the precoded symbols; and
   a symbol processor configured to form a sequence of transmit symbols comprising said tail symbols and said guard symbols from said symbol mapper and said precoded symbols from said vector precoder.

2. The modulator according to claim 1, wherein said symbol mapper is further configured to map respective sets of multiple bits of said bit sequence into respective symbols to form said symbol sequence comprising said data symbols, said training symbols, said tail symbols and said guard symbols.

3. The modulator according to claim 1, further comprising a symbol interleaver configured to interleave said training symbols among said data symbols to form at least $Q \geq 3$ sets of said data symbols separated by respective sets of at least one of said training symbols.

4. The modulator according to claim 1, wherein said vector precoder is further configured to apply one of a discrete Fourier transformation, an inverse discrete Fourier transformation, a discrete cosine transformation, an inverse discrete cosine transformation, a discrete wavelet transformation and an inverse discrete wavelet transformation to said data symbols and said training symbols to form said corresponding precoded symbols of said data symbols and said training symbols.

5. The modulator according to claim 4, wherein
said symbol mapper is further configured to generate a symbol vector $z=[z_1, \ldots, z_N]^T$ comprising said data symbols and said training symbols, where N represents a total number of said data symbols and said training symbols; and
said vector precoder is further configured to apply an N×N inverse discrete Fourier transform matrix w to said symbol vector to form said precoded symbols comprising said data symbols and said training symbols.

6. The modulator according to claim 4, wherein
said symbol mapper is further configured to generate a symbol vector $z=[z_1, \ldots, z_N]^T$ comprising said data symbols and said training symbols, where N represents a total number of said data symbols and said training symbols; and
said vector precoder is further configured to apply an N×N inverse discrete cosine transform matrix w to said symbol vector to form said precoded symbols comprising said data symbols and said training symbols.

7. The modulator according to claim 1, wherein said precoded symbols from said vector precoder form a vector $Z=[Z_1, \ldots, Z_N]$ and wherein said processor configured to add one of said prefix and said postfix to said precoded symbols comprises a cyclic prefix processor configured to add a cyclic prefix to said precoded symbols from said vector precoder by appending a last L precoded symbols from said vector precoder in said vector Z at a beginning of said vector z to form a new vector $Z_P=[Z_1^P, \ldots, Z_{N+L}^P]^T=[Z_{N-L}, \ldots Z_N, Z_1, \ldots, Z_N]^T$.

8. The modulator according to claim 1, wherein said symbol processor is further configured to form said sequence of transmit symbols comprising said precoded symbols from said vector precoder flanked by said tail symbols and flanked by said guard symbols.

9. The modulator according to claim 1, wherein said symbol mapper is further configured to:
map, for each said data symbol $x_i$, i=1, ..., D, a set of at least one said data bit into said data symbol drawn from a symbol constellation;
map, for each said training symbol $s_i$, i=1, ..., $N_{tr}$, a set of at least one said training bit into said training symbol drawn from a symbol constellation;
map, for each said tail symbol $t_i$, i=1, ..., v, a set of at least one said tail bit into said tail symbol drawn from a symbol constellation; and
map, for each said guard symbol $g_i$, i=1, ..., η, a set of at least one said guard bit into said guard symbol drawn from a symbol constellation.

10. The modulator according to claim 1, wherein said symbol mapper is further configured to map respective sets of at least one bit of said bit sequence into respective symbols to form a symbol sequence of quadrature amplitude modulation (QAM), and/or phase-shift keying (PSK) data symbols, training symbols, tails symbols and guard symbols.

11. The modulator according to claim 1, wherein said symbol mapper is further configured to select, for each said respective set of at least one bit, a symbol constellation selected from a quadrature amplitude modulation (QAM) symbol constellation and phase-shift keying (PSK) symbol constellation based on a position of said respective set within said bit sequence, wherein a first symbol constellation selected for a first said set of at least one bit is different from a second symbol constellation selected for a second said set of at least one bit.

12. The modulator according to claim 1, wherein said symbol mapper is further configured to map said respective sets of multiple bits of said bit sequence into respective symbols to form a symbol sequence comprising 156 symbols in total and 6 tails symbols, 8 guard symbols and 142 data and training symbols.

13. The modulator according to claim 1, further comprising a pulse shaper configured to modulate said sequence of transmit symbols onto a carrier signal having a bandwidth of M×200 kHz, where M is a positive integer.

14. A base station implementable in a radio-based communication network comprising:
a modulator, comprising:
a symbol mapper configured to receive a bit sequence corresponding to a radio burst and comprising data bits, training bits, tail bits and guard bits and to map respective sets of at least one bit of said bit sequence into respective symbols to form a symbol sequence comprising data symbols, training symbols, tail symbols and guard symbols;
a vector precoder configured to apply a vector precoding transformation to said data symbols and said training symbols without applying the vector precoding transformation to said tail symbols and said guard symbols to form corresponding precoded symbols of said data symbols and said training symbols;
a processor configured to add one of a prefix and a postfix to the precoded symbols; and
a symbol processor configured to form a sequence of transmit symbols comprising said tail symbols and said guard symbols from said symbol mapper and said precoded symbols from said vector precoder; and
a transmit antenna configured to transmit a radio burst carrying said sequence of transmit symbols during a time slot having a length of 15/26 ms.

15. A data modulation method comprising:
inputting a bit sequence corresponding to a radio burst and comprising data bits, training bits, tail bits and guard bits;
mapping respective sets of at least one bit of said bit sequence into respective symbols to form a symbol sequence comprising data symbols, training symbols, tail symbols and guard symbols;
applying a vector precoding transformation to said data symbols and said training symbols without applying the vector precoding transformation to said tail symbols and said guard symbols to form corresponding precoded symbols of said data symbols and said training symbols;
adding one of a prefix and a postfix to the precoded symbols; and
forming a sequence of transmit symbols comprising said tail symbols and said guard symbols and said precoded symbols.

16. The method according to claim 15, wherein mapping respective sets comprises mapping respective sets of multiple bits of said bit sequence into respective symbols to form said symbol sequence comprising said data symbols, said training symbols, said tail symbols and said guard symbols.

17. The method according to claim 15, further comprising interleaving said training symbols among said data symbols to form at least Q≥3 sets of said data symbols separated by respective sets of at least one of said training symbols.

18. The method according to claim 15, further comprising generating a symbol vector $z=[z_1, \ldots, z_N]^T$ comprising said data symbols and said training symbols, where N represents a total number of said data symbols and said training symbols, wherein applying said vector precoding transformation comprises applying an N×N inverse Fourier transform matrix w to said symbol vector to form said precoded symbols comprising said data symbols and said training symbols.

19. The method according to claim 15, further comprising generating a symbol vector $z=[z_1, \ldots, z_N]^T$ comprising said data symbols and said training symbols, where N represents a total number of said data symbols and said training symbols, wherein applying said vector precoding transformation comprises applying an N×N inverse discrete cosine transform matrix w to said symbol vector to form said precoded symbols comprising said data symbols and said training symbols.

20. The method according to claim 15, further comprising:
generating a symbol vector $z=[z_1, \ldots, z_N]^T$ comprising said data symbols and said training symbols, where N represents a total number of said data symbols and said training symbols; and
wherein adding one of said prefix and said postfix to the precoded symbols comprises adding a cyclic prefix to said precoded symbols by appending a last L precoded symbols in said vector z at a beginning of said vector z to form a new vector $Z^P=[Z_1^P, \ldots, Z_{N+L}^P]^T = [Z_{N-L}, \ldots Z_N, Z_1, \ldots, Z_N]^T$.

21. The method according to claim 15, wherein mapping respective sets comprises:
selecting, for each said respective set of at least one bit, a symbol constellation from a quadrature amplitude modulation(QAM) symbol constellation and phase-shift keying (PSK) symbol constellation based on a position of said respective set within said bit sequence; and
mapping said set of at least one bit to a symbol drawn from said selected symbol constellation, wherein a symbol constellation selected for a first said set of at least one bit is different from a symbol constellation selected for a second said set of at least one bit.

22. The method according to claim 15, further comprising:
modulating said sequence of transmit symbols onto a carrier signal having a bandwidth of M×200 kHz, where M is an positive integer; and
transmitting a radio burst carrying said sequence of transmit symbols during a time slot having a length of 15/26 ms.

* * * * *